United States Patent
Andersson

(10) Patent No.: US 6,342,851 B1
(45) Date of Patent: Jan. 29, 2002

(54) METHOD AND ARRANGEMENT FOR DUTY CYCLE ENLARGEMENT

(75) Inventor: Bengt Andersson, Kullavik (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/388,606

(22) Filed: Sep. 2, 1999

(30) Foreign Application Priority Data

Sep. 9, 1998 (SE) ................................................ 9803051

(51) Int. Cl.$^7$ ................................................ G01S 7/282
(52) U.S. Cl. ........................ 342/134; 342/175; 342/202; 342/368
(58) Field of Search .................................. 342/131, 132, 342/134–144, 202–204, 25, 175, 179, 368–377

(56) References Cited

U.S. PATENT DOCUMENTS

| | | | | |
|---|---|---|---|---|
| 4,855,747 A | * | 8/1989 | Steinberg | 342/179 |
| 4,954,829 A | | 9/1990 | Fiden | |
| 5,021,789 A | * | 6/1991 | Shaw | 342/25 |
| 5,122,803 A | * | 6/1992 | Stann et al. | 342/25 |
| 5,608,404 A | * | 3/1997 | Burns et al. | 342/25 |
| 5,663,730 A | | 9/1997 | Isaksen | |
| 5,969,662 A | * | 10/1999 | Hellsten | 342/25 |

* cited by examiner

Primary Examiner—Bernarr E. Gregory
(74) Attorney, Agent, or Firm—Nixon & Vanderhye P.C.

(57) ABSTRACT

The duty cycle of a pulse train from a pulse radar antenna is increased by dividing the antenna aperture into sub-apertures (1–5), generating separate pulse trains from said sub-apertures (1–5), and time shifting the separate pulse trains between themselves to produce a resulting pulse train having shorter pulse spacing or wider pulses.

21 Claims, 2 Drawing Sheets

$T_1$-$T_5$ = transmitting modules
SA1-SA5 = sub-apertures

T₁-T₅ = transmitting modules
SA1-SA5 = sub-apertures

METHOD AND ARRANGEMENT FOR DUTY CYCLE ENLARGEMENT

TECHNICAL FIELD

The invention relates generally to pulse radars having active electronically scanned array antennas (AESA radars), i.e. pulse radars of the type where the antenna itself is provided with active transmitting elements, and more specifically to a method and an arrangement for increasing the duty cycle of pulse trains from such radars.

BACKGROUND OF THE INVENTION

Pulse radar transmitters generate pulse trains having a certain peak power and a certain average power. Since such a transmitter operates with a certain peak power, continuous wave (CW) signals cannot normally be generated because the average power of such a signal would be so high that the transmitter would be damaged. In other words, the pulse radar transmitters of today are designed for a maximum duty cycle that cannot be exceeded.

However, there are applications in which it would be advantageous to use a pulse radar also for more or less continuous transmission. It may sometimes be desired to transmit e.g. data via a data link to targets which the radar "sees". To get a reasonably high data transfer rate in such data link applications, it would be necessary to use CW signals or at least pulsed signals having a high duty cycle. Today, it is not possible to use a pulse radar transmitter as the transmitting part in a data link since it cannot transmit the desired CW signal for the reason mentioned above. Instead, in such applications, separate data transmitters have to be used.

There are also other applications, such as jamming of other radar systems, in which it would be advantageous to use pulse radar transmitters for CW operation.

SUMMARY OF THE INVENTION

The object of the invention is to enable, in a pulse radar, transmission of pulse trains having a higher duty cycle than what the pulse radar is designed to transmit, and even transmission of a continuous wave signal.

This is generally attained by dividing the aperture of the radar antenna into sub-apertures associated with their own transmitting elements or modules, generating separate pulse trains in the same direction in each sub-aperture, and time shifting the separate pulse trains in such a manner that the pulses of the separate pulse trains form a resulting pulse train having a larger duty cycle than the duty cycle of the separate pulse trains.

Hereby, the use of existing pulse radar systems will be broadened, and the need of special separate data transmitters in connection with pulse radars will be eliminated.

BRIEF DESCRIPTION OF THE DRAWINGS

The invention will be described more in detail below with reference to the appended drawing on which

DETAILED DESCRIPTION OF THE INVENTION

Figure 1:
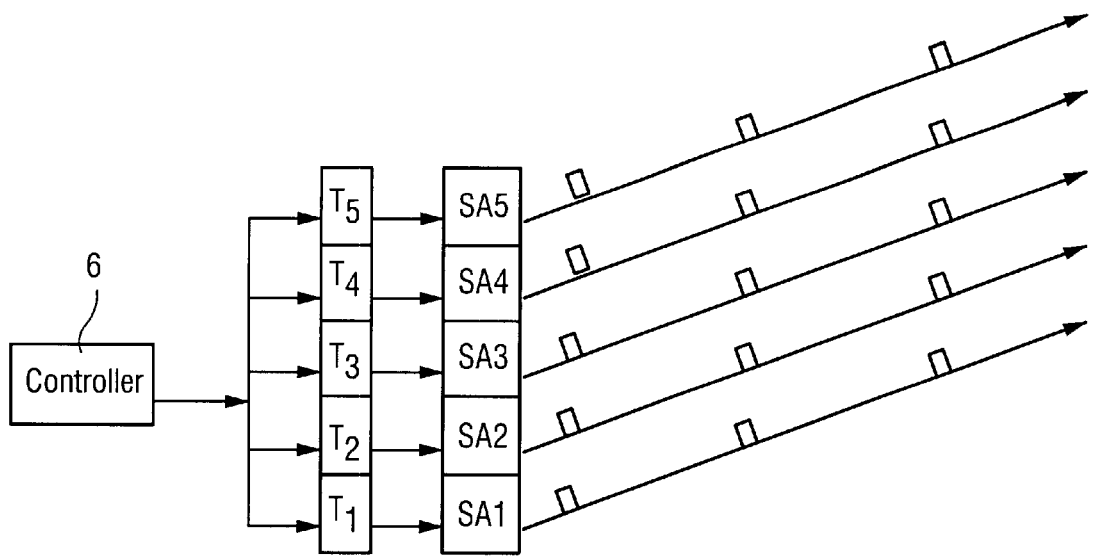
FIG. 1 is a schematic side view of an embodiment of a pulse radar antenna aperture with associated transmitting modules, divided into sub-apertures generating separate pulse trains in accordance with the invention.

FIG. 1 is a schematic side view of an embodiment of a pulse radar antenna aperture with its associated transmitting elements or modules. In accordance with the invention, the transmitting modules are grouped together in at least two sub-groups in such a manner that at least two sub-apertures with associated transmitting modules are formed.

In the embodiment shown in FIG. 1, the antenna aperture is to be divided into five sub-apertures SA1–SA5 with associated transmitting modules $T_1$–$T_5$. The transmitting modules $T_1$–$T_5$ associated with the respective sub-apertures SA1–SA5 are separately controlled by a controller means 6.

As schematically illustrated in FIG. 1, under the control of the controller 6 connected to the transmitting modules $T_1$–$T_5$ associated with each sub-aperture SA1–SA5, the five sub-apertures SA1–SA5 generate separate pulse trains, which, in the embodiment in FIG. 1, are all supposed to be of the same pulse repetition frequency. Also, the widths of the pulses are supposed to be the same in the separate pulse trains.

As will be described below, it is however to be understood that the separate pulse trains do not necessarily have to be of the same pulse repetition frequency. Neither do the widths of the pulses of the separate pulse trains have to be the same.

Below, three example embodiments of duty cycle enlargement of pulse trains in accordance with the invention will be described with reference to FIGS. 2a–e and 3, FIGS. 4a–e and 5, and FIGS. 6a–c and 7, respectively.

Figure 2:
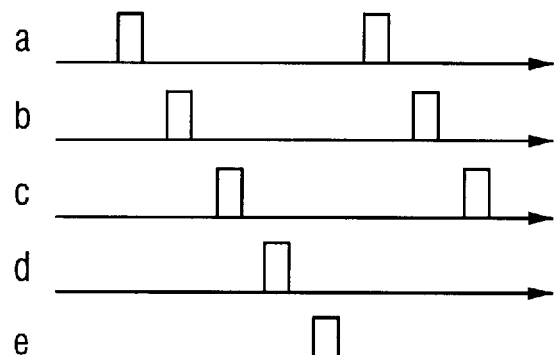
FIGS. 2a–e illustrate a first embodiment of pulse trains generated by the sub-apertures and their associated transmitting modules in FIG. 1.
Figure 3:
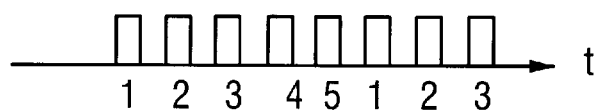
FIG. 3 illustrates the resulting pulse train obtained by means of the pulse trains in FIGS. 2a–e in accordance with the invention.

In a first embodiment illustrated in FIGS. 2 and 3, it is supposed that the five separate pulse trains generated by the sub-apertures 1, 2, 3, 4 and 5, respectively, in FIG. 1, have a duty cycle of less than 20%, i.e. the ratio between the pulse width and the pulse period of the separate pulse trains is less than 20%. The pulse width is normally a few or some microseconds.

In accordance with the invention, the control means 6 comprises a time shifting means (not separately shown), which is adapted to time shift the pulse trains between themselves.

In this first embodiment, four of the five separate pulse trains are time shifted relative to the fifth pulse train in such a manner that one pulse from each of these four time shifted pulse trains falls between two successive pulses of the fifth pulse train with equal spacing between the pulses.

This is illustrated in FIGS. 2a–e and FIG. 3. As apparent from these figures, the pulse trains in FIGS. 2b–e which are supposed to be generated by the sub-apertures SA1–SA5 in FIG. 1, are time shifted relative to the pulse train in FIG. 2a which is supposed to be generated by the sub-aperture SA1 in FIG. 1, in such a manner that one pulse from each of the pulse trains generated by the sub-aperture SA1 which equal spacing between the pulses. The resulting pulse train from the five sub-apertures SA1–SA5 in FIG. 1, is illustrated in FIG. 3.

As apparent from FIG. 3, in the resulting pulse train, the spacing between the pulses from the different pulse trains is shorter than the spacing between the pulses in the separate pulse trains in FIGS. 2a–e.

Consequently, the resulting pulse train in FIG. 3 has a higher duty cycle than the separate pulse trains in FIGS. 2a–e.

In a second embodiment illustrated in FIGS. 4a–e and FIG. 5, it is also supposed that the five separate pulse trains generated by the sub-apertures 1–5 in FIG. 1, have a duty cycle of less than 20%.

In this embodiment of the invention, the time shifting means of the controller 6, is adapted to time shift the five pulse trains between themselves in such a manner that the pulses from four of the different pulse trains will follow immediately upon each other between two successive pulses from the fifth pulse train.

Figure 4:
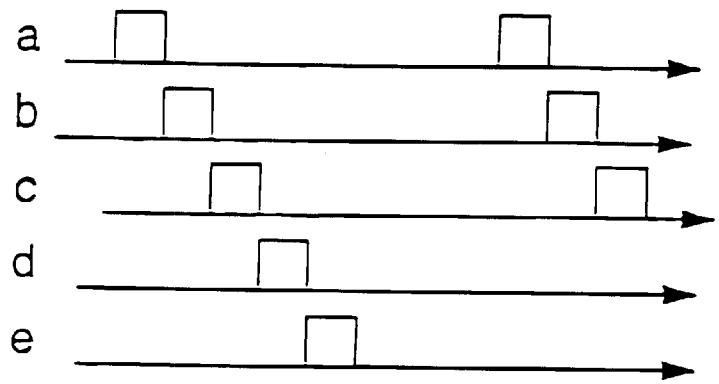
FIGS. 4a–e illustrate a second embodiment of pulse trains generated by the sub-apertures and their associated transmitting modules in FIG. 1.
Figure 5:
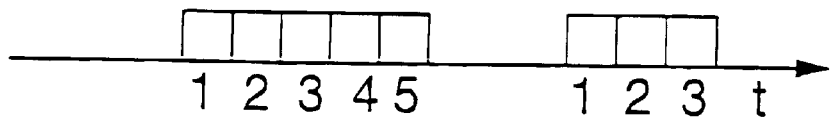
FIG. 5 illustrates the resulting pulse train obtained by means of the pulse trains in FIGS. 4a–e in accordance with the invention.

This is illustrated in FIGS. 4a–e and FIG. 5. As apparent from these figures, the pulse trains in FIGS. 4b–e which are supposed to be generated by the sub-apertures SA1–SA5 in FIG. 1, are time shifted relative to the pulse train in FIG. 4a which is supposed to be generated by the sub-aperture SA1 in FIG. 1, in such a manner that a pulse from the pulse train in FIG. 4a is immediately followed by a pulse from the pulse train in FIG. 4b, which in its turn is immediately followed by a pulse from the pulse train in FIG. 4c, which in its turn is immediately followed by, a pulse from the pulse train in FIG. 4d, which in its turn is immediately followed by a pulse from the pulse train in FIG. 4e, with no spacing between the five separate pulses. The resulting pulse train from the five apertures 1–5 in FIG. 1 in this second embodiment, is illustrated in FIG. 5.

As apparent from FIG. 5, the pulses of the resulting pulse train are the sum of the pulses of the separate pulse trains illustrated in FIGS. 4a–e. Thus, the resulting pulse train will have pulses of a width that is five times the width of the pulses of each of the separate pulse trains.

As a consequence, the resulting pulse train as shown in FIG. 5 will have the same pulse repetition frequency as the separate pulse trains in FIGS. 4a–e, but the duty cycle of the resulting pulse train will be five times higher than the duty cycle of each of the separate pulse trains in FIGS. 4a–e.

In a third embodiment illustrated in FIGS. 6a–c and FIG. 7, it is supposed that the duty cycle of each of the five separate pulse trains generated by the sub-apertures SA1–SA5 in FIG. 1, is equal to 20%.

In this third embodiment of the invention, the time shifting means of the controller 6, is adapted to time shift the five pulse trains between themselves in the same manner as in the above second embodiment, i.e., such that the pulses from four of the different pulse trains will follow immediately upon each other between two successive pulses from the fifth pulse train to form a resulting continuous goal.

Figure 6:
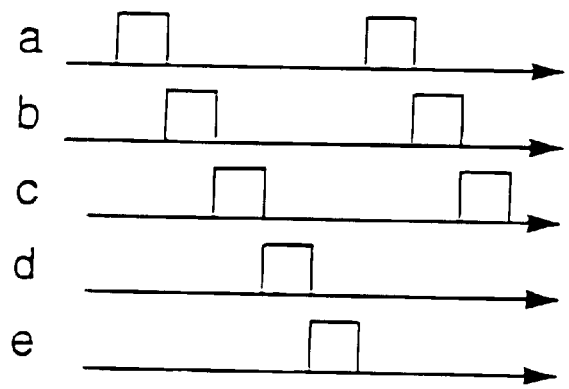
FIGS. 6a–e illustrate a third embodiment of pulse trains generated by the sub-apertures and their associated transmitting modules in FIG. 1.

This is illustrated in FIGS. 6a–c and FIG. 7. As apparent from these figures, the pulse trains in FIGS. 6b–c which are supposed to be generated by the sub-apertures SA1–SA5 in FIG. 1, are time shifted relative to the pulse train in FIG. 6a which is supposed to be generated by the sub-aperture SA1 in FIG. 1, in such a manner that a pulse from the pulse train in FIG. 6a is immediately followed by a pulse from the pulse train in FIG. 6b, which in its turn is immediately followed by a pulse from the pulse train in FIG. 6c, which in its turn is immediately followed by a pulse from the pulse train in FIG. 6d, which in its turn is immediately followed by a pulse from the pulse train in FIG. 6e, with no spacing between the five separate pulses.

In view of the fact that the duty cycle of each of the five separate pulse trains generated by the sub-apertures SA1–SA5 in FIG. 1 in this third embodiment, is supposed to be equal to 20%, the spacing between two successive pulses in the pulse train in FIG. 6a will be completely filled up by the pulses from the pulse trains in FIGS. 6b–e.

Figure 7:
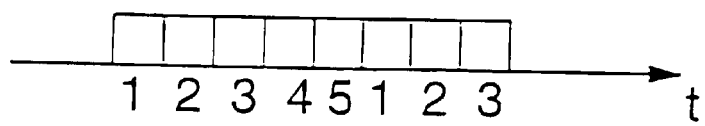
FIG. 7 illustrates the resulting pulse train obtained by means of the pulse trains in FIGS. 6a–e in accordance with the invention.

Consequently, the resulting "pulse train" from the five apertures SA1–SA5 in FIG. 1 in this embodiment, will be a CW signal having a duty cycle of 1.0, as illustrated in FIG. 7.

As illustrated in FIG. 7, the resulting CW signal is made up of the pulses of the separate pulse trains illustrated in FIGS. 6a–e.

By means of the CW signal illustrated in FIG. 7, it will be possible to transfer e.g. data by using the pulse radar in FIG. 1 as a transmitting link terminal. The CW signal is then modulated with data information in accordance with any known, suitable method.

Generally, to generate a CW signal in accordance with the above third embodiment of the invention, each of n separate pulse trains generated by n sub-apertures should have equal pulse frequencies and a duty cycle of 100/n%.

As indicated above, the separate pulse trains do not necessarily have to be of the same pulse repetition frequency, and the widths of the pulses of the separate pulse trains do not have to be the same.

By means of the sub-apertures of the antenna according to the invention, a pulse position modulated resulting signal (not shown) may e.g., be generated by appropriately ordering pulses from the different apertures by means of the controller 6. Also in this case, the duty cycle of the resulting pulse train would be higher than the duty cycle of the individual pulse trains.

By not having the same widths of the pulses of the separate pulse trains, the resulting pulse train illustrated in FIG. 5 may be generated e.g. by doubling the widths of the pulses of the pulse trains in FIGS. 4b and 4d, and not using the pulse trains in FIGS. 4c and 4e. In that case, the resulting pulse train would be generated by means of only three sub-apertures. Also in this case, the duty cycle of the resulting pulse train would be higher than the duty cycle of the individual pulse trains.

As should be apparent from the above, by means of the invention, the use of existing pulse radar systems will be broadened, and the need of special separate data transmitters in connection with pulse radars will be eliminated.

While the present invention has been described with respect to a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention.

What is claimed is:

1. A method of increasing the duty cycle of a pulse train from a pulse radar antenna having an aperture associated with transmitting modules, comprising:
   dividing the aperture into at least two sub-apertures by associating a number of the transmitting modules with the respective sub-aperture,
   controlling the transmitting modules associated with the respective sub-aperture to generate separate pulse trains from the respective sub-aperture, and
   time-shifting the separate pulse trains to produce from the separate pulse trains, a resulting pulse train of a higher duty cycle than the separate pulse trains.

2. The method as claimed in claim 1, comprising:
generating the separate pulse trains with the same pulse repetition frequency, and with pulses of the same width.

3. The method as claimed in claim 1, comprising:
generating at least one of the separate pulse trains with a different pulse repetition frequency than the other separate pulse trains.

4. The method in claim 1, comprising:
generating pulses of at least one of the separate pulse trains with a different width than the pulses of the other separate pulse trains.

5. The method as claimed in claim 1, comprising:
time-shifting the separate pulse trains to obtain a shorter spacing between the pulses of the resulting pulse train than in the separate pulse trains.

6. The method as claimed in claim 1, comprising:
time-shifting the separate pulse trains in such a manner that the width of the pulses of the resulting pulse train is the sum of the widths of the pulses of the separate pulse trains.

7. The method as claimed in claim 6, comprising:
generating n separate pulse trains, each having a duty cycle of 100/n %, whereby the resulting signal will be a continuous signal.

8. An apparatus for increasing the duty cycle of a pulse train from a pulse radar antenna comprising:
transmitting modules;
an aperture divided into at least two sub-apertures, each transmitting module being associated with a respective sub-aperture,
a control means for controlling the transmitting modules associated with the respective sub-aperture to generate separate pulse trains from the respective sub-aperture and for time shifting the separate pulse trains to produce, from the separate pulse trains, a resulting pulse train of a higher duty cycle than the separate pulse trains.

9. The apparatus as claimed in claim 8, wherein the separate pulse trains have the same pulse repetition frequency, and the pulses are of the same width.

10. The apparatus as claimed in claim 9, wherein at least one of the separate pulse trains is of a different pulse repetition frequency than the other separate pulse trains.

11. The apparatus as claimed in claim 8, wherein the pulses of at least one of the separate pulse trains differ in width from the pulses of the other separate pulse trains.

12. The apparatus as claimed in claim 8, wherein the spacing between the pulses of the resulting pulse train is shorter than in the separate pulse trains.

13. The apparatus as claimed in claim 8, wherein the width of the pulses of the resulting pulse train is the sum of the widths of the pulses of the separate pulse trains.

14. The apparatus as claimed in claim 13, wherein there are n separate pulse trains, wherein n is a positive integer, and that each separate pulse train has a duty cycle of 100/n %, whereby the resulting, signal will be a continuous signal.

15. An apparatus for increasing the duty cycle of a pulse train from a pulse radar antenna comprising:
transmitting modules;
an aperture divided into at least two sub-apertures each transmitting module being associated with a respective sub-aperture;
a controller for controlling the transmitting modules associated with the respective sub-aperture to generate separate pulse trains from the respective sub-aperture and to time shift the separate pulse trains to produce a resulting pulse train of a higher duty cycle than the separate pulse trains.

16. The apparatus as claimed in claim 15, wherein the separate pulse trains have the same pulse repetition frequency, and the pulses are of the same width.

17. The apparatus arrangement as claimed in claim 15, wherein at least one of the separate pulse trains is of a different pulse repetition frequency than the other separate pulse trains.

18. The apparatus as claimed in claim 15, wherein the pulses of at least one of the separate pulse trains differ in width from the pulses of the other separate pulse trains.

19. The apparatus as claimed in claim 15, wherein the spacing between the pulses of the resulting pulse train is shorter than the separate pulse trains.

20. The apparatus as claimed in claim 15, wherein the width of the pulses of the resulting pulse train is the sum of the widths of the pulses of the separate pulse trains.

21. The apparatus as claimed in claim 20, wherein there are n separate pulse trains where n is a positive integer, and that each separate pulse train has a duty cycle of 100/n %, whereby the resulting signal will be a continuous signal.

* * * * *